July 9, 1968    F. SNEEN    3,391,612
PISTON SEALING ELEMENTS IN HYDRAULIC MOTORS
Filed June 6, 1966    2 Sheets-Sheet 1
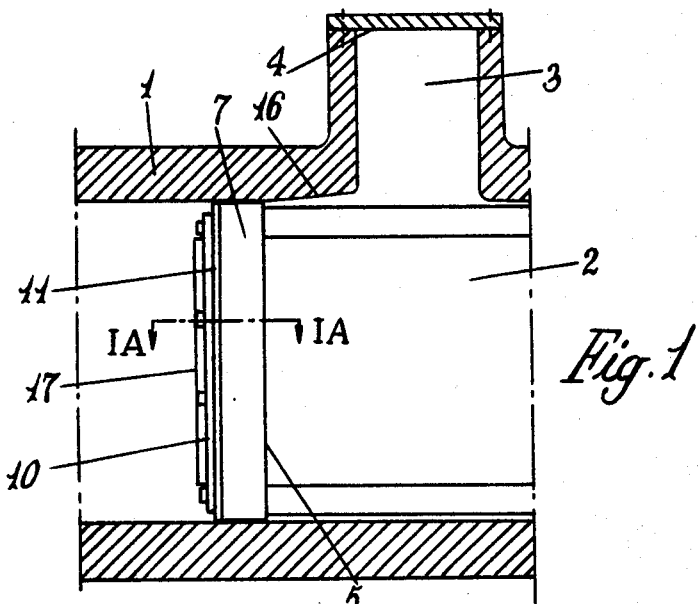
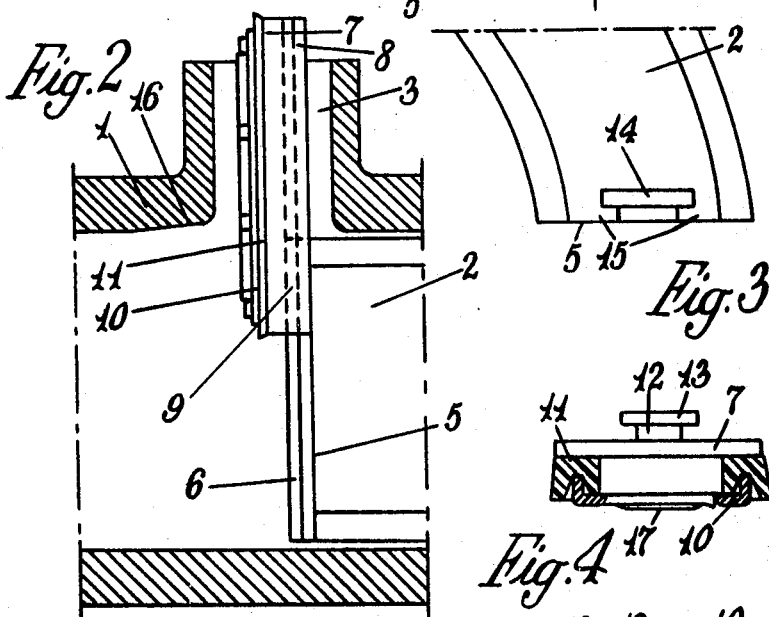
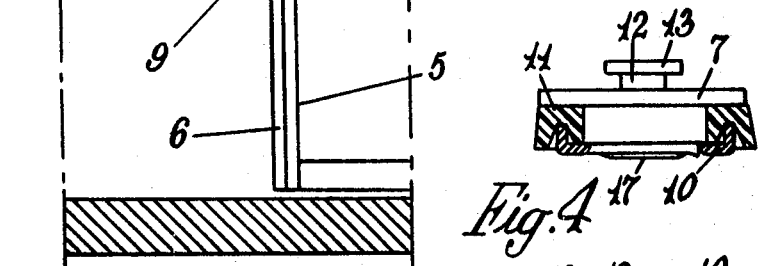
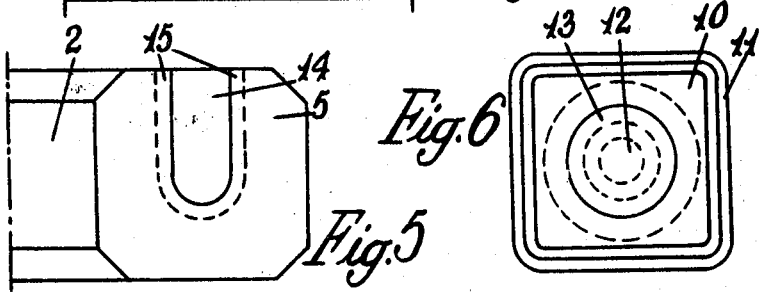
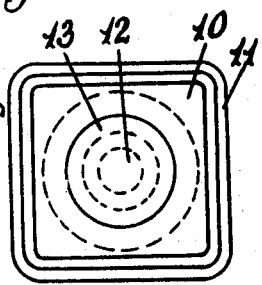

United States Patent Office 3,391,612
Patented July 9, 1968

3,391,612
PISTON SEALING ELEMENTS IN
HYDRAULIC MOTORS
Franz Sneen, Topasgatan 40, V. Frolunda
Goteborg, Sweden
Filed June 6, 1966, Ser. No. 555,459
Claims priority, application Sweden, June 5, 1965,
1,658/65
5 Claims. (Cl. 92—128)

ABSTRACT OF THE DISCLOSURE

A hydraulic motor in which a cylinder having a side wall aperture is provided with a piston movable therein. The piston has at one axial end thereof a radial slidable mounting plate removable through the aperture. The plate is equipped with a peripheral sealing element for sealing between the piston and the cylinder. A radially slidable interlocking means is located between the piston and mounting plate and a retaining member is utilized for fiixedly attaching the sealing element to the mounting plate.

---

Figure 1A:
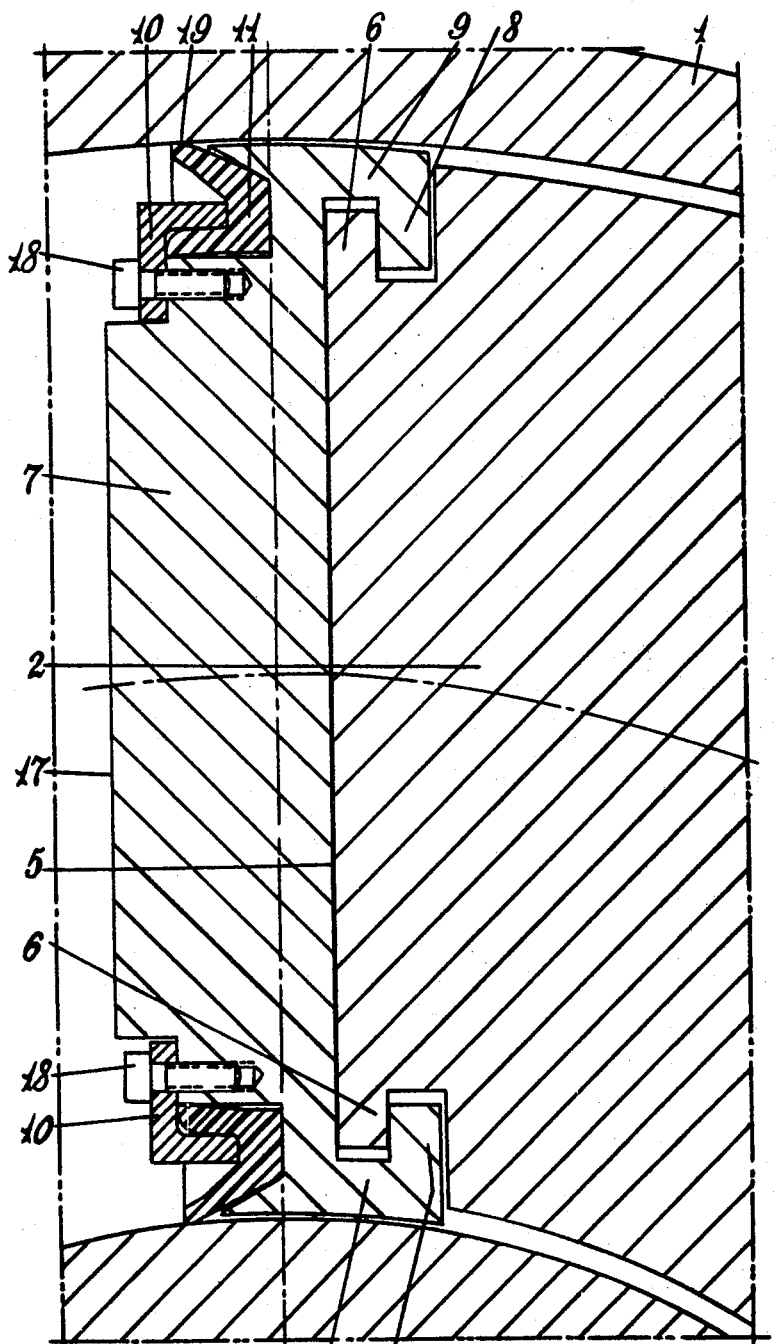

This invention relates to a piston sealing element attached to the end face of a piston in a hydraulic motor, wherein the sealing element is made from deformable material, e.g., leather or rubber.

Until the present time, when the sealing element was damaged or worn and had to be replaced, it was necessary to dismantle the motor so that the plate attached to the end face of the motor piston and retaining the sealing element in position could be removed. This operation was time consuming, and therefore considerable expense was involved in replacing the sealing element.

An object of the present invention is to provide a cylinder and piston in which the sealing element can be changed quickly.

The invention consists in a piston for an hydraulic motor provided with a mounting plate carrying a sealing element, wherein the mounting plate is slidably removable from the end of the piston in a direction perpendicular to the longitudinal axis of the piston.

Preferably, the mounting plate is provided with two flanges having inwardly directed projections slidably engageable with corresponding guide flanges of the piston.

Alternatively, the mounting plate is provided with a stem carrying a flange engageable in a corresponding notch in the piston.

The invention further consists in a hydraulic motor comprising a piston cylinder assemblage and a piston as described above movable therein, wherein the cylinder is provided with an aperture through which the mounting plate carrying the sealing element may be removed.

Conveniently the aperture is adjacent an end position of the cylinder.

Preferably, the cylinder wall adjacent the aperture is inclinedly recessed.

The invention will be further described with reference to two embodiments shown in the accompanying drawings, wherein:

FIGURE 1 is a longitudinal view in part section, of an embodiment of the invention with the aperture cover closed, FIGURE 1a is a section taken along the line 1a—1a of FIGURE 1, the view looking in the direction of the arrows, FIGURE 2 is a view similar to FIGURE 1 with an opened cover and a partly removed mounting plate, FIGURE 3 is a longitudinal view in section of an annular piston constituting a second embodiment of the invention and FIGURE 4 is a longitudinal cross-sectional view of a corresponding mounting plate for said second embodiment, FIGURE 5 is an end view of FIGURE 3, and
FIGURE 6 is an end view of FIGURE 4.

In FIGURES 1, 1a and 2, a substantially square-shaped cylinder 1 of a hydraulic piston motor having a square-shaped piston 2 is provided with a lateral aperture 3 adjacent one of the end positions of the piston 2. The lateral aperture 3 is at least as wide as the cylinder 1, and is provided with a sealing cover 4. End face 5 of the piston 2 is provided with two lateral guide flanges 6.

Mounting plate 7 is provided, on one face, with a frame-shaped retaining element 10 for retaining a sealing element 11 by means of bolts 18, and, on the opposite face, with two parallel flanges 9 having inwardly directed projections 8 engageable with the guide flanges 6.

Boss 17 of the mounting plate 7 projects beyond the retaining element 10 and bolts 18.

The invention operates as follows:

When the sealing element is worn and needs to be replaced, the piston 2 is brought to the end position with the mounting plate 7 adjacent aperture 3. Cover 4 is removed and the mounting plate together with the sealing element 11 and retaining member are removed through the aperture 3. Bolts 18 are unscrewed, the retaining member 10 removed and a new sealing element 11 inserted. The retaining member 10 and bolts 18 are replaced, and the mounting plate 7 inserted through the aperture 3 and slid onto the piston 2 by means of the guides flanges 6 and projections 8. The aperture 3 is then closed with the cover 4.

Preferably, the wall of the cylinder 1 adjacent the aperture 3 is provided with an inclined recess as shown in FIGURES 1 and 1a so that lip 19 of the sealing element 11 is not caught and bent around on contacting the edge of the aperture 3, but is compressed gradually against the wall of the cylinder 1.

If the mounting plate 7 strikes the end face of the cylinder 1, the boss 17 prevents the retaining member 10, or the sealing element 11, striking against the end face and deforming the sealing element 11.

The above-described arrangement may be used with both straight and annular pistons, and is independent of the transverse section of the cylinder 1.

If the cylinder 1 is provided with a similar sealing element at its end, then an aperture 3 may be arranged in such a way, and have such dimensions that a mounting plate carrying this sealing element may be removed through the aperture.

A second embodiment, as shown in FIGURES 3 to 6, differs from the first embodiment in that the mounting plate 7 is provided with a stem 12 carrying a disc-shaped flange 13 engageable with a T-shaped notch 14 formed by flanges 15 in the end face 5 of the piston 2.

The stem 12 may, alternatively, be in the form of a hook engageable with a corresponding recess at the end of the notch 14.

This invention is not to be confined to any strict conformity to the showings in the drawings but changes or modifications may be made therein so long as such changes or modifications mark no material departure from the spirit and scope of the appended claims.

I claim:

1. A hydraulic motor comprising a cylinder having a side wall aperture; a piston movable in the cylinder, said piston having at one axial end thereof a radially slidable, removable through said aperture, mounting plate provided with a peripheral sealing element for sealing between the piston and the cylinder, radially slidable interlocking means between said piston and plate and a retaining member for fixedly attaching the sealing element to the mounting plate.

2. The hydraulic motor as claimed in claim 1, wherein the mounting plate has two parallel flanges having inwardly directed projections, and the piston has, adjacent said axial end thereof, corresponding guide flanges slidably engageable with said projections.

3. The hydraulic motor as claimed in claim 1, wherein the piston is provided, at the said axial end thereof with a notch, and the mounting plate has a stem carrying a flange slidably engagable with said notch.

4. The hydraulic motor as claimed in claim 1, wherein the cylinder wall adjacent the aperture is inclinedly recessed towards the aperture.

5. The hydraulic motor as claimed in claim 1, wherein the face of the mounting plate opposite the face adjacent said axial end of the piston is provided with a raised portion constituting a boss projecting, in the axial direction of the piston, beyond other elements attached to the mounting plate.

References Cited

UNITED STATES PATENTS

| 1,097,563 | 5/1914 | Sowden | 92—250 X |
| 1,469,267 | 10/1923 | Rembold | 29—156.5 |
| 1,739,644 | 12/1929 | Lugt | 92—128 |
| 1,899,846 | 2/1933 | Boyd | 287—103 |
| 3,039,340 | 6/1962 | Livermont | 287—103 |

FOREIGN PATENTS 2,406 11/1931 Australia.

MARTIN P. SCHWADRON, *Primary Examiner.*

I. C. COHEN, *Assistant Examiner.*